United States Patent

[11] 3,581,139

[72] Inventors Harry H. Haft
Whippany;
Robert W. Repsher, Kennelon, N.J.
[21] Appl. No. 808,801
[22] Filed Mar. 20, 1969
[45] Patented May 25, 1971
[73] Assignee Westinghouse Electric Corporation
Pittsburgh, Pa.

[54] FLUORESCENT LAMP HAVING TITANIUM DIOXIDE-CONTAINING GLASS ENVELOPE AND REDUCED PHOSPHOR WEIGHT
6 Claims, 8 Drawing Figs.

[52] U.S. Cl. .................................................. 313/109, 313/221
[51] Int. Cl. ....................................................... H01j 61/30, H01j 61/42
[50] Field of Search ............................................. 313/109, 221, 112; 106/52

[56] References Cited
UNITED STATES PATENTS

| | | | |
|---|---|---|---|
| 3,067,356 | 12/1962 | Ray | 313/109X |
| 3,094,641 | 6/1963 | Gungle et al. | 313/109 |
| 3,148,300 | 9/1964 | Graff | 313/221 |
| 3,255,373 | 6/1966 | Van Broekhoven et al. | 313/109 |
| 3,377,494 | 4/1968 | Repsher | 313/221X |
| 2,774,903 | 12/1956 | Burns | 313/109 |

FOREIGN PATENTS

| | | | |
|---|---|---|---|
| 543,095 | 1/1932 | Germany | 106/52 |

OTHER REFERENCES

" Effects of Titanium Dioxide in Glass", M. D. Beals Glass Industry, Oct. 1963 pp. 569— 573.

*Primary Examiner*—Roy Lake
*Assistant Examiner*—Palmer C. Demeo
*Attorneys*—A. T. Stratton, W. D. Palmer and D. S. Buleza ABSTRACT: $TiO_2$ is included as a constituent in the soda-lime silicate glass envelope of a fluorescent lamp in an amount sufficient to chemically stabilize the glass an thus permit the use of a thinner phosphor coating without decreasing the light output of the lamp or impairing its lumen maintenance. Up to 10 percent by weight $TiO_2$ is employed and less than 2 percent by weight is preferred to minimize lamp cost. The $TiO_2$ also inhibits solarization and the resultant darkening of the envelope under the influence of the impinging ultraviolet radiations generated within the lamp during operation.

With 1.25 percent by weight $TiO_2$ in the glass, the amount of phosphor required per lamp is reduced by 30 percent without decreasing the light output or lumen maintenance. In the case of calcium halophosphate type phosphor, the phosphor weight per lamp is reduced by 40 percent without impairing the lumen maintenance and with only a slight drop in light output compared to a conventional lamp utilizing the same type of phosphor.

FLUORESCENT LAMP HAVING TITANIUM DIOXIDE-CONTAINING GLASS ENVELOPE AND REDUCED PHOSPHOR WEIGHT

CROSS-REFERENCE TO RELATED APPLICATIONS

The present invention is related to and is an improvement upon the subject matter disclosed and claimed in pending application Ser. No. 744,832 of Edward G. F. Arnott et al. filed July 15, 1968, which application is entitled "Electric Lamp Having an Envelope Composed of Photoresistant Soda-Lime Silicate Glass" and is assigned to the assignee of the present application. The invention is also related to the subject matter disclosed in application Ser. No. 808,802 of R. W. Repsher filed concurrently herewith.

BACKGROUND OF THE INVENTION

1. Field of the Invention

This invention relates to electric lamps and has particular reference to an improved fluorescent lamp.

2. Description of the Prior Art

The prime objective in the design and manufacture of fluorescent lamps is the provision of a lamp which has the highest light output and lumen maintenance and the lowest manufacturing cost. Heretofore, it has been the general practice in the fluorescent lamp industry to make the lamp envelopes from soda-lime silicate glass and to coat the inner surface of the envelope with a suitable ultraviolet-responsive phosphor, such as a calcium halophosphate phosphor, to a coating density which will provide optimum light output. It has been found that bulbs fabricated from such conventional glasses are solarized and darken under the influence of the impinging ultraviolet radiations generated within the lamp. In addition, as the lamp burns, a deleterious chemical interaction occurs at the phosphor glass interface which desensitizes the phosphor and produces a blackening effect in this region. Obviously, all of these reduce the light output of the lamp. As a result, the prior art lamps required a heavy or thick coating of phosphor for optimum light output and lumen maintenance during life. Such heavy coatings, in effect, provided a "barrier" layer of phosphor at the glass surface which inhibited solarization of the bulb and prevented the alkali constituents of the soda-lime glass from chemically reacting with the upper strata of the phosphor coating.

The deleterious darkening effects produced in fluorescent lamps by the alkali constituents present in soda-lime silicate glasses is well known in the art and various means have been proposed to solve this problem. It has been proposed, for example, that up to 4 percent by weight of antimony trioxide be included in the soda-lime silicate glass envelope to inhibit the diffusion of alkali ions to the envelope surface and thereby reduce the formation of dark deposits of mercury-alkali amalgam. A fluorescent lamp having such a modified soda-lime silicate glass envelope is disclosed and claimed in U.S. Pat. No. 3,094,641, issued June 18, 1963 to W. C. Gungle et al.

Separate transparent barrier layers on the inner surface of the glass envelope have also been proposed. A fluorescent lamp of this type wherein a barrier layer consisting of titanium dioxide or zirconium oxide with additional metal oxides is interposed between the phosphor coating and the inner surface of a soda-lime silicate glass envelope is disclosed in U.S. Pat. No. 3,377,494, issued Apr. 9, 1968 to R. W. Repsher. This patent also discloses that up to 20 percent less phosphor by weight can be used when such a separately formed barrier layer is used.

Fluorescent lamps having separate transparent barrier layers composed of $TiO_2$, $SiO_2$ or $Al_2O_3$ are disclosed in U.S. Pat. Nos. 3,141,990; 3,205,394 and 3,067,356, respectively.

In the aforementioned pending Arnott et al. application Ser. No. 744,832, there is disclosed a fluorescent lamp having a chemically stabilized and photoresistant soda-lime silicate glass envelope that contains up to 10 percent by weight $TiO_2$ and is interiorly coated with an ultraviolet-responsive phosphor such as calcium halophosphate phosphor. However, the phosphor coating is of the same density as that used heretofore and the lamp thus contains the same amount of phosphor as conventional fluorescent lamps now being marketed.

SUMMARY

It is accordingly the general object of the present invention to provide an improved fluorescent lamp which has the same light output and lumen maintenance characteristics as a conventional lamp but has a much lower manufacturing cost.

Another and more specific object is the provision of a fluorescent lamp which is of the same quality as a conventional lamp as regards light output and lumen maintenance but contains up to about 3 percent less phosphor.

Another object is the provision of a fluorescent lamp that contains from 30 percent to 40 percent less phosphor than conventional fluorescent lamps now being marketed and has the same lumen maintenance characteristic and only a slightly lower light output than such conventional lamps.

The foregoing objects and other advantages are achieved in accordance with the present invention by utilizing a chemically-stabilized titania-containing soda-lime silicate glass envelope of the type disclosed in the aforementioned pending Arnott et al. application and decreasing the amount of phosphor coated onto the interior surface of the bulb by up to 30 percent in a manner which is so correlated to the $TiO_2$ content of the glass that the light output and lumen maintenance of the lamp are equal to or better than those exhibited by a conventional lamp that contains a much larger amount of the same phosphor. Further reductions in the phosphor weight up to a total of 40 percent are achieved with a small sacrifice in light output but no impairment of lumen maintenance.

In accordance with a preferred embodiment of the invention, the modified soda-lime silicate glass bulb contains 1.25 percent by weight $TiO_2$ and the density of the phosphor coating is reduced by an amount such that the lamp has the same light output and lumen maintenance as a conventional lamp but contains only 70 percent of phosphor employed in a conventional lamp.

In accordance with another embodiment of the invention, the phosphor weight per lamp is reduced by from 30 percent to 40 percent of the amount required for optimum light output in a conventional lamp without any sacrifice in lumen maintenance and only a 2.5 percent loss of light output by utilizing a modified soda-lime silicate glass bulb that contains from 1 percent to 2 percent by weight $TiO_2$.

BRIEF DESCRIPTION OF THE DRAWINGS

A better understanding of the invention will be obtained by referring to the accompanying drawings, wherein.

DESCRIPTION OF THE PREFERRED EMBODIMENTS

Figure 1:
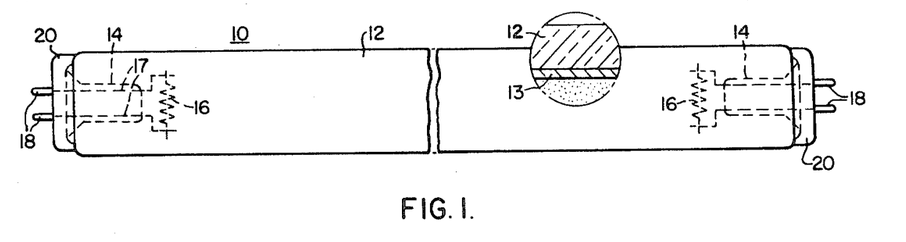
FIG. 1 is a fragmentary elevational view of a fluorescent lamp embodying the present invention, a portion of the phosphor-coated envelope being shown in enlarged cross section for illustrative purposes.

In FIG. 1 there is shown a fluorescent lamp 10 which embodies the present invention and consists of a tubular light transmitting bulb or envelope 12 that is composed of $TiO_2$ containing soda-lime silicate glass and is interiorly coated with a uniform layer 13 of a suitable ultraviolet-responsive phosphor, such as calcium halophosphate phosphor. The ends of the envelope 12 are sealed to glass stems 14 which support a pair of conventional electrodes or cathodes 16. Each of the cathodes 16 are attached to a pair of lead-in wires 17 that are hermetically sealed through the respective stems 14. These lead wires are electrically connected to terminal pins 18 anchored in suitable base members 20 that are attached to the sealed ends of the bulb 12. The cathodes 16 are coated with an electron-emissive material (such as the usual alkaline-earth oxides) and, in conjunction with a predetermined amount of mercury and a suitable fill gas such as neon or a mixture of neon and argon at a pressure of approximately 2 millimeters, sustains a gaseous discharge when the lamp 10 is energized. The phosphor is deposited in a substantially uniform layer 13 on the envelope 12, the stems 14 are sealed into the envelope and the latter is exhausted, dosed with mercury, etc. in the usual manner well known to those skilled in the art.

In accordance with the present invention, the envelope 12 is fabricated from soda-lime silicate glass that contains selected amounts of $TiO_2$ up to about 10 percent by weight. While the specific composition may vary, good results have been obtained with glasses having the following formulation (the various constituents being expressed in percentages by weight as calculated from the batch): 60 percent to 75 percent $SiO_2$, 5 percent to 18 percent $Na_2O$, 4 percent to 13 percent $MgO$ or $CaO$ (or a combination thereof), 0.5 percent to 3.4 percent $Al_2O_3$, 0.1 percent to 2 percent $K_2O$, 0.1 percent to 10 percent $TiO_2$, less than about 0.07 percent $Fe_2O_3$, and from 0.01 percent to 2 percent $As_2O_3$ or $Sb_2O_3$. This is the same type of glass as that disclosed in the aforementioned pending Arnott et al. application except that the $TiO_2$ content is not limited to a range of 0.8 to 10 percent. As disclosed hereinafter, an appreciable gain in light output can be obtained in accordance with the present invention with amounts of $TiO_2$ as low as 0.1 percent by weight. Hence, $TiO_2$ in the range of 0.1 percent to about 10 percent by weight can be used.

The addition of selected amounts of $TiO_2$ to conventional soda-lime silicate glass inhibits the discoloration or "solarization" effect of impinging ultraviolet radiations produced by the gaseous discharge within the lamp, as is disclosed in detail in the aforesaid Arnott et al. application. The increase in the photoresistivity of such modified glasses is illustrated by the graph shown in FIG. 2. The data on which this graph is based was obtained by adding from 0.1 percent to 10 percent by weight of $TiO_2$ to a conventional soda-lime silicate glass that contained 0.07 percent by weight $Fe_2O_3$ and is used for fluorescent lamp tubing. The samples were irradiated for 30 minutes by placing them against a clear ultraviolet-transmitting quartz section of a low-pressure mercury discharge lamp which was operated at an arc current and at an ambient temperature which simulated those of a standard 40 watt fluorescent lamp. Since the quartz section of the envelope of the discharge lamp was clear and devoid of phosphor coating, the glass samples were subjected to about 30 times the dosage of 2537A radiation as that which would impinge upon the envelope of a conventional fluorescent lamp that was operated for the same length of time.

Figure 2:
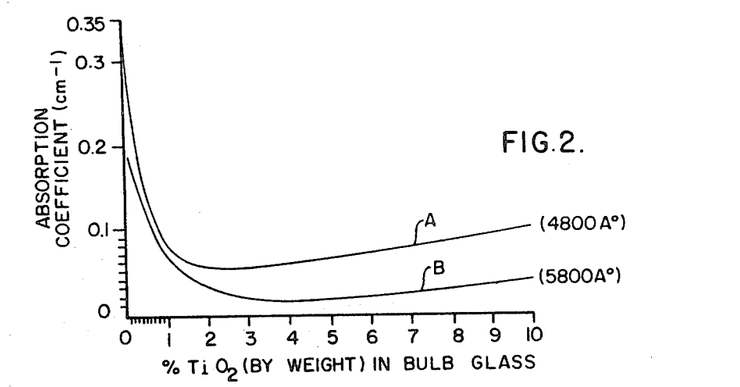
FIG. 2 is a graph illustrating the light-absorption characteristics of a soda-lime silicate glass that has been modified by the addition of selected amounts of $TiO_2$ and irradiated with UV.

As indicated by curve A of FIG. 2, the absorption coefficient of the $TiO_2$-modified glasses in the 4800A region of the visible spectrum decreases sharply to a value of 0.1 cm.[11] as the $TiO_2$ content is increased from 0.1 percent to 0.8 percent by weight, reaches a minimum of about 0.06 cm.[11] at about 2 percent $TiO_2$, and then increases gradually to 0.1 cm.[11] when the $TiO_2$ content reaches 10 percent by weight. Curve B represents the absorption coefficient in the 5800A region of the visible spectrum and is quite similar to curve A except that it reaches a minimum of 0.02 cm.[11] at about 3 percent by weight $TiO_2$ and then gradually increases to 0.04 cm.[11] as the $TiO_2$ content is increased to a value of 10 percent by weight.

Surprisingly, glasses containing these amounts of $TiO_2$ do not crystallize and their melt viscosities are about the same as those for similar soda-lime silicate glasses without titania. Their working properties are disclosed in the aforementioned pending Arnott et al. application and are such that lamps having bulbs made from these $TiO_2$-modified soda-lime silicate glasses can be manufactured on the same high-speed lamp-making machines now in use.

In addition to increasing the resistance of the envelope to the solarization effects of ultraviolet radiation, comparative lamp tests have revealed that the addition of selected amounts of titania to the bulb glass has a marked effect on the lumen output of fluorescent lamps made with such bulbs. This effect is illustrated by the graph shown in FIG. 3 wherein the percent increase in lumens at 100 hours burning (compared to a conventional lamp having the same phosphor) is plotted against $TiO_2$ contents that vary from 0 to slightly over 2 percent by weight. As shown by curve C, the light output increases rapidly as soon as $TiO_2$ is included in the bulb glass. It increases by about 0.25 percent with only 0.1 percent $TiO_2$ in the glass, begins to level off at about 1 percent by weight $TiO_2$ and reaches a maximum (about 1.6 percent gain) when the $TiO_2$ content reaches 2 percent by weight. The curve thus shows that significant increases in the light output of a fluorescent lamp can be achieved with very small amounts of $TiO_2$ in the bulb glass and that practically all of the lumen increase (1.5 percent) is achieved with about 1.25 percent by weight $TiO_2$. Thus, while up to about 10 percent by weight $TiO_2$ can be incorporated in the bulb glass in order to enhance its photoresistivity, from the standpoint of cost versus enhanced light output, the $TiO_2$ content is maintained below about 2 percent by weight and 1.25 percent by weight $TiO_2$ is preferred.

Figure 3:
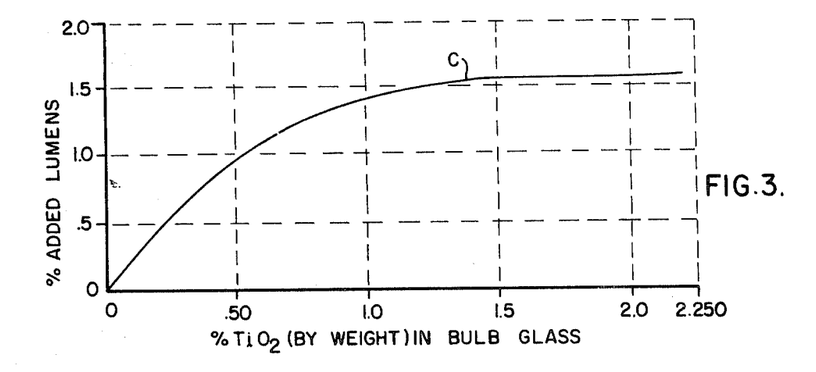
FIG. 3 is a graph illustrating the percent increase in maximum lumens obtained with fluorescent lamps having bulbs composed of modified soda-lime silicate glasses which contain selected amounts of $TiO_2$ up to about 2.25 percent by weight.

The data on which FIG. 3 is based was obtained by measuring the light output (after 100 hours burning) of a series of 40 watt T12 fluorescent lamps having bulbs composed of soda-lime silicate glasses that contained the indicated amounts of $TiO_2$. The total amount of phosphor (calcium halophosphate) coated onto the inner surface of the respective lamps, that is, the phosphor coating density, was the same as that used in conventional lamps. Curve C thus reveals that for a given phosphor and a given phosphor coating density, the lumen output can be increased 1.6 percent above the maximum output of a conventional lamp of the same type by including 2 percent by weight $TiO_2$ in the bulb glass.

The term "phosphor coating density" as used herein is related to the optical density of the phosphor coating and is a measure of the phosphor weight or total amount of phosphor employed in the lamp. Since the phosphor coating consists of a layer of many finely divided phosphor particles of varying size, light rays passing through the coating are scattered to a degree which is dependent upon the size of the phosphor particles and the number of such particles that are struck by the light rays as they pass through the layer. As the average particle size increases, the amount of phosphor required to achieve a given optical density also increases since large particles have less scattering effect.

For convenience, the phosphor coating density will be expressed in the description which follows in terms of optical density values. These values, in turn, will be expressed as arbitrary numbers which correspond to the reading of a microammeter which is connected to a Weston Model 594 photocell. The photocell is located 1½ inches from the axis of the lamp envelope in line with a ground glass filter that is positioned 3 inches from the envelope axis and on the other side of the envelope. A light source, such as a 150 watt PAR 38 incandescent lamp, is placed adjacent the filter at a location such that it produces a beam of light which is so directed that it passes through the filter and both walls of the coated lamp envelope along a path that is normal to and intersects the envelope axis. The photocell is so calibrated with respect to the intensity of the light beam that a bulb having a phosphor coating of the density or thickness customarily employed in the art produces a reading of 24 on the microammeter when the bulb is placed in the density measuring device.

As the phosphor weight per lamp is decreased for a given average particle size, the phosphor layer becomes thinner and the scattering of the traversing light beam is reduced so that the microammeter registers a higher reading. Thus, the optical density of the coating as measured by the photocell increases as the amount of phosphor per square centimeter of envelope surface (true coating density) decreases. Hence, higher optical density numbers indicate lower actual phosphor coating densities and phosphor weights. The correlation between these optical density readings or numbers, the phosphor weight per lamp (expressed in percent) for a given phosphor, and the percent increase in the intensity of the light beam which strikes the photocell are set forth in table I below.

TABLE I

| Optical density: | Phosphor weight (percent) | Percent increase of light beam intensity |
|---|---|---|
| 22 | 112 | |
| 23 | 106 | |
| 24 (standard) | 100 | 0 |
| 25 | 95 | 4.17 |
| 26 | 91 | 8.34 |
| 27 | 87 | 12.51 |
| 28 | 83 | 16.68 |
| 29 | 79 | 20.85 |
| 30 | 75 | 25.02 |
| 31 | 72 | 29.19 |
| 32 | 69 | 33.36 |
| 33 | 66 | 37.53 |
| 34 | 63 | 41.70 |
| 35 | 60 | 45.87 |

As will be noted, the conventionally coated lamp constitutes the standard and its optical density of 24 corresponds to 100 percent phosphor weight. This standard optical density is based on a 40 watt, 4 foot T12 fluorescent lamp that is uniformly coated with calcium halophosphate phosphor particles which have an average particle size of 12 microns and contains a total of approximately 7.4 grams of phosphor (equivalent to 6.9 milligrams of phosphor per square centimeter of envelope surface). A lamp of the same size which has an optical density 1 unit higher than the standard will have a thinner phosphor coating density. Measurements have shown that the resultant reduction in phosphor weight is 5 percent (95 percent of standard phosphor weight). The intensity of the light beam which traverses the envelope of a lamp having an optical density of 25 is, accordingly, increased by 1/24th or 4.17 percent. Thus, an optical density of 30 is equivalent to a 25 percent reduction in phosphor weight and an increase of approximately 25 percent in the intensity of the transmitted light beam, and an optical density of 35 is equivalent to a 40 percent reduction in phosphor weight and a 45.87 percent increase in light beam intensity.

The term "average phosphor particle size" as used herein and in the appended claims means the average diameter of the phosphor particles in microns as measured by a Coulter Counter measuring instrument which is well known in the art and marketed by the Coulter Electronics, Inc., Franklin Park, Illinois. Thus, the weight of the particles having a diameter larger than the average diameter is equal to the weight of the particles which have a diameter smaller than the average diameter.

The novel concept of the present invention resides in the discovery that the amount of a given phosphor required in a fluorescent lamp can be drastically reduced without any loss of lumens or decrease in lumen maintenance by utilizing an envelope of soda-lime silicate glass that contains a relatively small and selected amount of $TiO_2$. This is graphically illustrated in FIG. 4 wherein the lumen output (at 100 hours) of a series of 40 watt T12 fluorescent lamps having bulbs containing various amounts of titania and coated with standard phosphor weights are compared to the maximum lumen output of a conventional lamp of the same size. The percent change in lumens relative to the maximum lumen output of the conventional lamp is plotted along the ordinate and the variation in the phosphor weight (expressed as a percent of the conventional phosphor weight) are plotted along the abscissa. Curve D represents the conventional lamp (no $TiO_2$ in the bulb glass, 100 percent phosphor weight, optical density of 24) and shows that maximum light output requires a certain amount of a given phosphor (7.4 grams of a calcium halophosphate phosphor having an average particle size of 12 microns in the case illustrated). As the phosphor weight is decreased, the lumen output drops and decreases by 4 percent when the optical density is 34 (63 percent phosphor weight).

Figure 4:
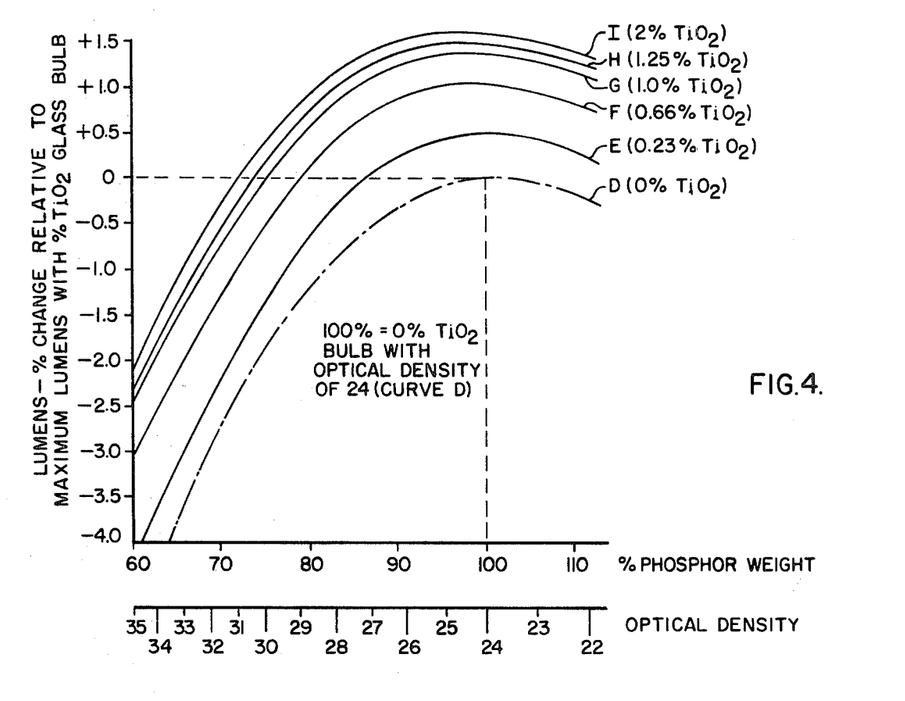
FIG. 4 is a graph illustrating the percent change in lumens, at various phosphor coating densities, exhibited by fluorescent lamps having soda-lime silicate glass bulbs that contain selected amounts of $TiO_2$ compared to the maximum light output of a conventional fluorescent lamp that has an unmodified soda-lime silicate glass envelope.

Curve E shows that by adding 0.23 percent by weight $TiO_2$ to the bulb glass the resulting increase in lumens (0.5 percent) with 100 percent phosphor weight permits the amount of phosphor per lamp to be decreased by 13 percent (87 percent phosphor weight and optical density 27) without any sacrifice in output as compared to the conventional lamp which contains 100 percent phosphor weight.

As shown by curve F, with 0.66 percent, by weight $TiO_2$ in the bulb glass the lumen increase is 1 percent when 100 percent phosphor weight is used. Lamps with such bulbs can thus be produced which have a light output that is equal to the maximum light output of the conventional lamp and contain only 79 percent of the phosphor weight (optical density 29). Thus, the use of 0.66 percent $TiO_2$ in the bulb glass permits the total amount of phosphor to be reduced by 21 percent without any sacrifice in lumens.

Curve G shows that the incorporation of 1 percent by weight $TiO_2$ in the bulb glass produces a lumen increase such that a light output equivalent to the maximum output of the conventional lamp (curve D) can be achieved with 25 percent less phosphor (75 percent phosphor weight and optical density 30).

As indicated by curves H and I (1.25 percent and 2 percent $TiO_2$, respectively), the rate at which the lumens increase with 100 percent phosphor weight begins to drop off as the titania content of the bulb glass exceeds about 1 percent by weight. This agrees with the data shown in FIG. 3. Curve H shows that when the preferred amount of titania (1.25 percent by weight) is added to the bulb glass, a light output equivalent to that of the conventional lamp can be achieved with approximately 27 percent less phosphor, (73 percent phosphor weight and an optical density of about 31). Curve I shows that 2 percent by weight titania in the bulb glass achieves the same light output with only about 71 percent of the phosphor weight (an optical density of slightly over 31).

As will be noted from curves F, G, H and I in FIG. 4, it is within the scope of the invention to reduce the amount of phosphor required per lamp by an even greater amount if a small decrease in lumens can be tolerated. Thus, if 2 percent by weight titania is included in the bulb glass, the corresponding curve I shows that the amount of phosphor per lamp can be reduced by 35 percent (optical density of approximately 33 and 65 percent phosphor weight) with a 1 percent loss of lumens, and that the amount of phosphor can be reduced by 40 percent (optical density 35 and 60 percent phosphor weight)

with approximately a 2 percent loss of lumens. Curves H and G show that the loss in lumens with 35 percent and 40 percent less phosphor is proportionately greater in lamps having bulbs which contain 1.25 percent and 1 percent by weight TiO$_2$, respectively. As the titania content is decreased below 1 percent by weight, curve F (0.66 percent TiO$_2$) shows that the drop in lumens with 35 percent and 40 percent less phosphor (optical density of 33 to 35) exceeds 2 percent. Thus, if a lumen output equivalent to the maximum output of a conventional fluorescent lamp is desired, the present invention provides a very convenient and practical way of achieving this with up to 30 percent less phosphor than was required heretofore. If a small loss of lumens can be tolerated, the invention permits a reduction of up to 40 percent in the phosphor weight normally employed. Since millions of fluorescent lamps are made each year by the industry and phosphor is one of the most expensive components used in the lamp, the invention represents a major cost reduction and advance in the art.

Tests have shown that the inclusion of selected amounts of TiO$_2$ in the bulb glass does not impair the lumen maintenance of lamps made with such bulbs. This is evident from FIG. 5 which shows the percent change in lumens during life exhibited by a series of 40 watt T12 lamps having bulbs made of glass with 0.23 percent, 0.66 percent, 1.25 percent and 2 percent by weight TiO$_2$ (curves K, L, M, and N respectively), compared with a conventional lamp of the same type having a bulb with no titania (curve J). The lamps in each case where uniformly coated with an identical phosphor (calcium halophosphate) to a conventional optical density of 24. As will be noted, after the lamps burned for 100 hours and became stabilized the lumen output was up to 1.6 percent greater in the case of the lamps containing titania, with the degree of improvement decreasing with lower titania contents.

Figure 5:
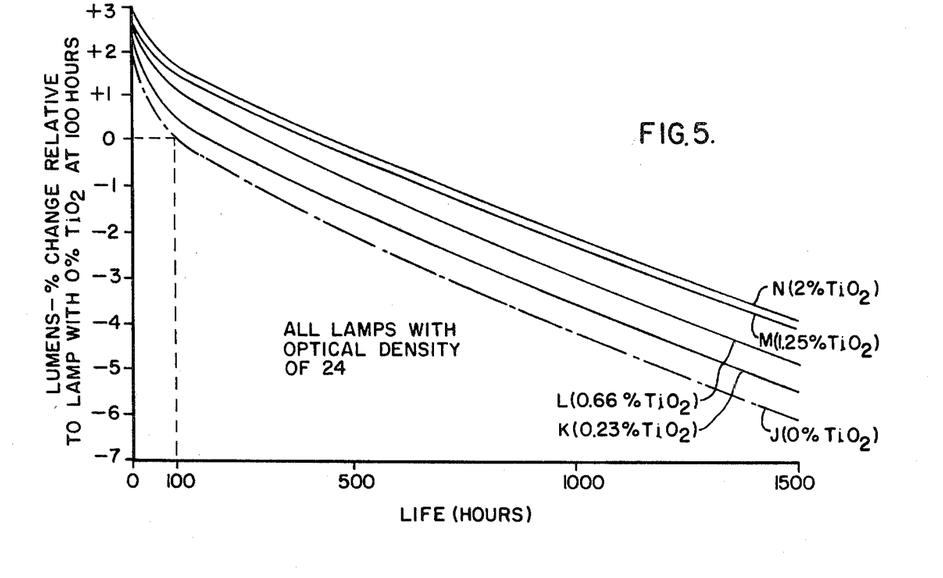
FIG. 5 is a graph illustrating the percent change in lumen maintenance of fluorescent lamps that have titania-modified glass bulbs compared to a standard fluorescent lamp having a conventional soda-lime silicate glass envelope.

After 1,500 hours burning the lumen maintenance of the lamps made with TiO$_2$-modified bulb glass was higher than that of the conventional lamp as indicated by the slight upward divergence of each of the curves K to N from curve J at 1,500 hours life compared to their closer grouping at 100 hours life. The upward divergence of curves M and N (1.25 percent and 2 percent titania, respectively) from the adjacent curve L (0.66 percent titania) indicates that these lamps have a higher lumen maintenance. The curves accordingly show that the lumen maintenance of fluorescent lamps made with bulbs containing selected amounts of titania up to 2 percent by weight is superior to that of conventional fluorescent lamps and that optimum improvement at the least cost is achieved with a titania content of 1.25 percent by weight.

Figure 6:
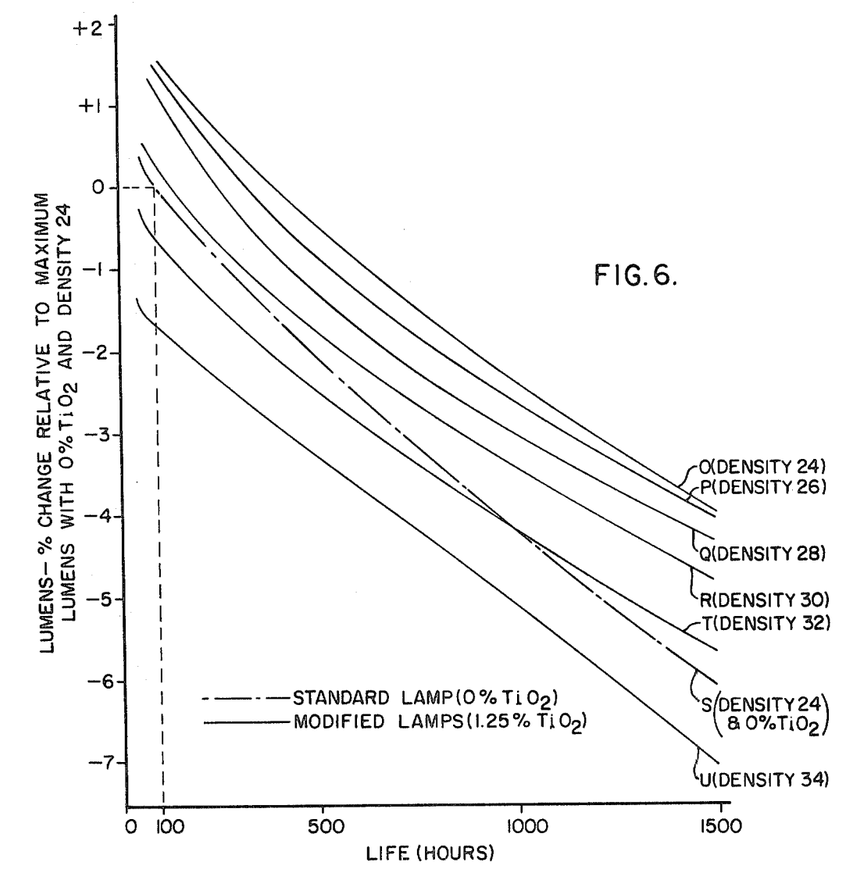
FIG. 6 is a graph illustrating the lumen maintenance characteristics of a series of fluorescent lamps having various phosphor coating densities and bulbs which contain 1.25 percent by weight $TiO_2$ compared to the maintenance of a standard fluorescent lamp having a bulb composed of conventional soda-lime silicate glass.

The light output and lumen maintenance of lamps having TiO$_2$-modified bulbs and up to 30 percent less phosphor is equivalent to or better than that of conventional lamps. This is shown in FIG. 6 wherein the lumen maintenance of a standard 40 watt T12 lamp (curve S) is compared to a series of lamps of the same type that have bulbs which contain the preferred 1.25 percent TiO$_2$ and are provided with phosphor layers of different coating densities. Curve O represents the lumen maintenance characteristic of a lamp that contains the same amount of phosphor as the conventional lamp (optical density 24) but which has 1.25 percent by weight titania included in the bulb glass. Curves P, Q, R and T show the lumen maintenance of lamps identical with the conventional lamp except that the bulb glass contained 1.25 percent titania and the amount of phosphor coated onto the bulbs was decreased from 9 percent to about 30 percent (as indicated by the optical densities of 26, 28, 30 and 32 for curves P, Q, R and T, respectively.

Curve U represents the lumen maintenance exhibited by a lamp identical to the other lamps except that it was coated with approximately 63 percent of the phosphor employed in the conventional lamp S. Thus, the lamp corresponding to curve U contained about 37 percent less phosphor than that employed in the conventional lamp and had a very thin phosphor coating which had an optical density of only 34. Other tests show that the lumen maintenance is equal to that of a conventional lamp when a phosphor weight which gives an optical density of 35 (40 percent reduction in phosphor) is used. Similar lamp tests have shown that the lumen maintenance decreases when such thin phosphor coatings are used on soda-lime glass bulbs that contain up to 4 percent by weight of antimony trioxide.

As will be noted from FIG. 6, the lumen maintenance of the lamps containing the same amount of phosphor as the conventional lamp and up to 75 percent of this amount (curves O, P, Q and R, respectively) was better than that of the standard lamp (curve S) with the maximum improvement being obtained with the lamp that contained the same amount of phosphor as the standard lamp:

Curves S and T show that the "break even" point with respect to light output with the particular type of phosphor used (calcium halophosphate) and bulb glass that contains 1.25 percent by weight titania occurs when the phosphor weight is reduced by about 30 percent (optical density of 32). This is indicated by the fact that curve T shows that a lamp made with these amounts of titania and phosphor has a light output that is slightly lower than the conventional lamp at 100 hours, approximately the same light output as the standard lamp after 1,000 hours burning, and a slightly higher output than the standard lamp after 1,500 hours burning. Curves S and T thus show that lamps containing only approximately 70 percent of the phosphor employed in a standard lamp are comparable to conventional prior art lamps as regards lumen maintenance and are even slightly superior in this regard after 1,500 hours burning.

Curve U (1.25 percent by weight TiO$_2$ and optical density of 34) shows that the phosphor weight per lamp can be reduced up to about 40 percent with less than a 1 percent loss in light output (7 percent drop in lumens at 1500 hours vs. slightly more than a 6 percent reduction in lumens at the same point in life of the conventional lamp represented by curve S). However, the lumen maintenance is not affected, as is indicated by the fact that curves S and U have substantially the same slope.

Figure 7:
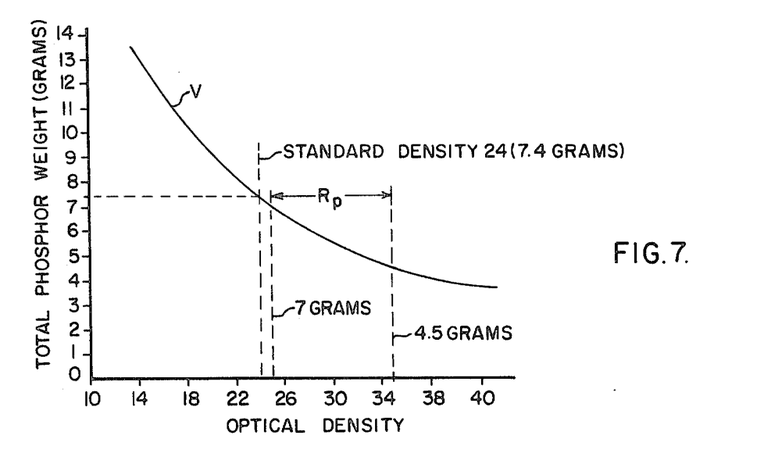
FIG. 7 is a graph illustrating the correlation between the phosphor coating density and the total amount of phosphor coated onto the inner surface of the glass bulb for a calcium halophosphate phosphor.

FIG. 7 illustrates the correlation between the optical density and the total phosphor weight required in a 40 watt T12 fluorescent lamp. Curve V is based on data obtained with a calcium halophosphate phosphor having an average particle size of about 12 microns. Other types of phosphors would have similar shaped curves. As will be noted, with this particular phosphor a total of 7.4 grams of phosphor per lamp is required to provide the standard coating density (optical density of 24). In contrast, by applying a thinner layer of phosphor on the inner surface of the lamp envelope 12 in accordance with the invention such that the phosphor coating has an optical density of 25 (5 percent decrease in phosphor weight) reduces the total amount of phosphor per lamp to about 7 grams. Reducing the phosphor coating thickness by an amount such that the coating has an optical density of 35 reduces the phosphor weight per lamp to 4.5 grams, which is equivalent to about a 40 percent reduction in the total phosphor weight. Hence, in accordance with the invention, the total amount of this particular type of halophosphate phosphor can be reduced from about 5 percent to about 40 percent (density reading of from 25 to 35 and range R$_P$ indicated in FIG. 7) with no impairment of lumen maintenance and only a slight reduction in light output when the very thin phosphor coatings equivalent to an optical density of 34 and 35 are employed.

The actual amount of phosphor required in a fluorescent lamp of a given type will depend, of course, upon the average size of the phosphor particles, the phosphor weight being generally proportional to the average particle size. Hence, as the average particle size increases the total amount of phosphor required to provide a phosphor coating of a given optical density also increases. This relationship is shown by graph depicted in FIG. 8 which is based on data obtained with a calcium halophosphate phosphor of the type generally employed in fluorescent lamps. As indicated by curve W, a conventional 40 watt T12 lamp having a bulb devoid of TiO$_2$ requires 2 grams of such a phosphor when the average particle size is 5 microns and approximately 9.3 grams when the average particle size is 17 microns in order to provide maximum light output (optical density of 24).

In contrast, fluorescent lamps of the same type having soda-lime silicate bulbs containing up to 10 percent by weight $TiO_2$ in accordance with the present invention require a smaller amount of such a phosphor, the specific amount varying according to the average particle size within the range of 5 and 17 microns and lying within the hatched area Z bounded by curves X and Y. Curve X corresponds to an optical density of 25 and 5 percent reduction in phosphor weight and curve Y to an optical density of 35 and a 40 percent reduction in phosphor weight. Thus, for a calcium halophosphate phosphor, the phosphor weight required for a 40 watt T12 fluorescent lamp having up to 10 percent by weight $TiO_2$ in the bulb glass will be determined by the average size of the phosphor particles and will lie within the hatched area Z shown in the graph of FIG. 8. In the case of a phosphor having an average particle size of 5 microns, approximately 1.2 to 1.9 grams of phosphor will be required per lamp in order to provide a phosphor coating having an optical density of from 25 to 35 (curves X and Y, respectively) in contrast to 2 grams of the same phosphor required in a conventional lamp (curve W) for substantially the same light output and lumen maintenance. In the case of a calcium halophosphate phosphor having an average particle size of 17 microns the total amount of phosphor required per lamp ranges from 5.6 grams to 8.8 grams compared to 9.3 grams for the conventional lamp.

The amount of phosphor required per lamp can also be expressed in terms of the amount of phosphor contained in each square centimeter of coated envelope surface. Expressed in these terms, the reduction in phosphor weight represented by the hatched area Z of FIG. 8 covers a range which has a lower limit of from 1.1 to 1.8 milligrams per square centimeter (the lower limit defined by curves X and Y for an average particle size of 5 microns) and an upper limit of from 5.3 to 8.3 milligrams per square centimeter (the upper limit defined by curves X and Y for a phosphor having an average particle size of 17 microns). Thus, the reduction in phosphor weight provided by the present invention can be applied to lamps having bulbs of a length and diameter which differ from those of the 4 foot T12 bulb discussed herein by coating the envelopes with a layer of phosphor which contains an amount of phosphor per square centimeter that lies within the milligram per square centimeter range that corresponds to the hatched region Z of FIG. 8.

The phosphor particles are coated onto the inner surface of the bulb 12 in a layer 13 that is substantially uniform in thickness from one end of the bulb to the other. The coating uniformity, of course, becomes increasingly important at higher optical densities (lower phosphor weights). This can be accomplished by suspending the phosphor in a suitable vaporizable water-based or organic-based solution of a solvent and an organic binder to form a phosphor paint that is uniformly coated onto the bulbs, and then dried and baked in accordance with coating techniques well known to those skilled in the art. The deposition of a uniform coating of phosphor paint on the bulb can be achieved by properly manipulating the bulb while the phosphor paint is still wet and draining. A novel method of obtaining a uniform phosphor coating by controlling the drying rate within a vertically positioned envelope on automatic coating machines is disclosed in the aforementioned concurrently-filed application Ser. No. 808,802 of Robert W. Repsher.

While the invention has been described in terms of a halophosphate phosphor, other suitable phosphors can be employed since the light output vs. optical density curves etc. will have the same general shape regardless of the specific optical density values, average particle size and phosphor weights. Examples of such other phosphors are strontium phosphate, zinc silicate and calcium tungstate.

It will be appreciated from the foregoing that the objects of the invention have been achieved in that a fluorescent lamp has been provided which has the same light output and lumen maintenance as a conventional lamp but contains up to 30 percent less phosphor. A further reduction in phosphor weight up to a total of 40 percent can readily be achieved with only a small sacrifice in light output and no impairment of lumen maintenance. These advantages are derived in a very convenient manner by including relatively small amounts of $TiO_2$ in the bulb glass during glass manufacture. The titania chemically stabilizes the glass and inhibits the formation of blackening deposits on the inner surface of the finished lamp which would otherwise occur as a result of chemical reactions with the mercury or other materials used in the lamp.

It will thus be understood that various modifications can be made in the specific embodiments illustrated and described without departing from the spirit or scope of the invention.

We claim:

1. A fluorescent lamp comprising, in combination;
a light-transmitting envelope comprising soda-lime silicate glass that contains a predetermined amount of $TiO_2$ up to about 10 percent by weight,
means sealed within said envelope adapted to sustain a gaseous discharge that generates ultraviolet radiation when the lamp is energized, and
a light-transmitting coating of phosphor on the inner surface of said envelope comprising a substantially uniform layer of finely divided phosphor particles that have a predetermined average particle size within a range of from about 5 to 17 microns and emit visible radiation in response to impinging ultraviolet radiation generated by said discharge,
the amount of $TiO_2$ in said soda-lime silicate glass being sufficient to inhibit solarization of the glass and deleterious chemical reaction at the phosphor-glass interface,
the total amount of said phosphor within said envelope being from about 5 percent to 40 percent by weight less than the total amount of said phosphor which is required to achieve optimum light output after 100 hours burning in an identical fluorescent lamp that is uniformly coated with said phosphor particles but has a soda-lime silicate glass envelope that is devoid of $TiO_2$, and
said phosphor coating having a thickness such that the amount of phosphor per square centimeter of coated envelope surface is generally proportional to the average particle size of said phosphor particles and lies within a range that has a lower limit of from about 1.1 to 1.8 milligrams per square centimeter for (a) phosphor having an average particle size of 5 microns and an upper limit of from about 5.3 to 8.3 milligrams per square centimeter for phosphor having an average particle size of 17 microns.

2. The fluorescent lamp of claim 1 wherein;
said envelope is of tubular configuration, approximately 4 feet long and has an outer diameter of approximately 1½ inches, and
the total amount of phosphor on the inner surface of said envelope varies according to the average particle size of the phosphor particles and, for phosphor having
a given average phosphor particle size within said range of from about 5 to 17 microns, lies within the hatched area Z of the graph shown in FIG. 8.

3. A fluorescent lamp comprising, in combination;
a light-transmitting envelope comprising soda-lime silicate glass that contains a predetermined amount of $TiO_2$ up to about 10 percent by weight,
mercury and an ionizable fill gas sealed within said envelope adapted to sustain a gaseous discharge that generates ultraviolet radiation when the lamp is energized, and
a light-transmitting coating of phosphor on the inner surface of said envelope comprising a substantially uniform layer of finely-divided phosphor particles that have a predetermined average particle size within a range of from about 5 to 17 microns and emit visible radiation in response to impinging ultraviolet radiation generated by said discharge, the amount of phosphor per square centimeter of envelope surface being generally proportional to the average size of said phosphor particles and being within a range that has a lower limit of from about 1.1 to 1.8 milligrams per square centimeter for a phosphor having an average particle size of 5 microns and an upper limit of from about 5.3 to 8.3 milligrams per square centimeter for a phosphor having an average particle size of 17 microns, and the amount of $TiO_2$ in said glass being sufficient to inhibit solarization of the glass and the formation of blackening deposits at the phosphor-glass interface due to chemical reaction between the mercury within the envelope and the alkali constituents of the glass.

Figure 8:
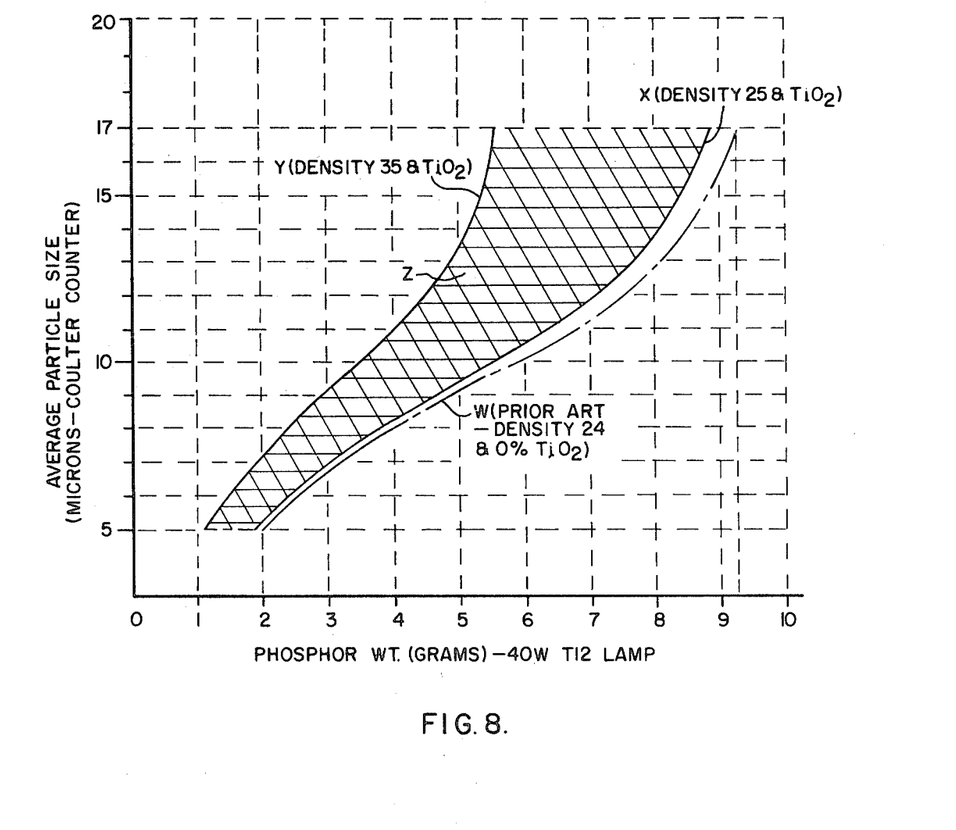
FIG. 8 is a graph contrasting the reduction in phosphor weight (5 percent to 40 percent) achieved by the invention for a phosphor having different average phosphor particle sizes with the amount of the same phosphor required in a conventional lamp of the same size.

4. The fluorescent lamp of claim 3 wherein;

said envelope is of tubular configuration, is approximately 4 feet long and has an outer diameter of approximately 1½ inches, and the total amount of phosphor on said coated envelope for a given average phosphor particle size within said range of from about 5 to 17 microns lies within the hatched area Z of the graph shown in FIG. 8.

5. The fluorescent lamp of claim 4 wherein;

said soda-lime silicate glass contains less than about 2 percent by weight $TiO_2$, and said phosphor is a halophosphate phosphor.

6. The fluorescent lamp of claim 5 wherein;

said soda-lime silicate glass contains about 1.25 percent by weight $TiO_2$, and said halophosphate phosphor comprises calcium halophosphate.

UNITED STATES PATENT OFFICE
CERTIFICATE OF CORRECTION

Patent No. 3,581,139          Dated May 25, 1971

Inventor(s) Harry H. Haft and Robert W. Repsher

It is certified that error appears in the above-identified patent and that said Letters Patent are hereby corrected as shown below:

In the ABSTRACT, line 3, "an" should read -- and --.

Column 2, line 15, "3 percent" should read -- 30 percent --.

Column 4, lines 10, 12, 13, 17 and 18, "cm.$^{11}$" should read -- cm.$^{-1}$ --.

Column 10, line 50, delete "(a)".

Signed and sealed this 19th day of September 1972.

(SEAL)
Attest:

EDWARD M. FLETCHER, JR.
Attesting Officer

ROBERT GOTTSCHALK
Commissioner of Patents